(12) United States Patent
Gittleman

(10) Patent No.: US 12,127,909 B2
(45) Date of Patent: Oct. 29, 2024

(54) ADJUSTABLE LOCKING DEVICE AND METHODS OF USING SAME

(71) Applicant: Neal B. Gittleman, Houston, TX (US)

(72) Inventor: Neal B. Gittleman, Houston, TX (US)

( * ) Notice: Subject to any disclaimer, the term of this patent is extended or adjusted under 35 U.S.C. 154(b) by 519 days.

(21) Appl. No.: 17/478,607

(22) Filed: Sep. 17, 2021

(65) Prior Publication Data

US 2023/0088844 A1    Mar. 23, 2023

(51) Int. Cl.
    *A61C 8/00* (2006.01)
(52) U.S. Cl.
    CPC .......... *A61C 8/0068* (2013.01); *A61C 8/0054* (2013.01); *A61C 8/0071* (2013.01)
(58) Field of Classification Search
    CPC ..... A61C 8/005; A61C 8/0068; A61C 8/0054; A61C 8/0071; A61C 8/0048; A61C 8/0078; A61C 8/0095; A61C 8/0053
    See application file for complete search history.

(56) References Cited

U.S. PATENT DOCUMENTS

| 9,265,591 | B1* | 2/2016 | Gittleman | A61C 8/0053 |
| 2008/0241790 | A1* | 10/2008 | Gittleman | A61C 8/0068 |
| | | | | 433/172 |
| 2008/0261174 | A1* | 10/2008 | Gittleman | A61C 8/0048 |
| | | | | 433/172 |
| 2014/0134566 | A1* | 5/2014 | Lemke | A61C 9/004 |
| | | | | 433/29 |

* cited by examiner

*Primary Examiner* — Cris L. Rodriguez
*Assistant Examiner* — Luis Ruiz Martin
(74) *Attorney, Agent, or Firm* — Tumey LLP; Eric M. Adams

(57) ABSTRACT

One or more specific embodiments disclosed herein includes a dental apparatus comprising a prosthesis, an implant fixture, a multi-unit abutment comprising a clocked projection and a conic section, and an adjustable locking device. The adjustable locking device may comprise a washer, a first pyramidal element, plurality of expansion segments each comprising a plurality of bottom planar surfaces and a plurality of top planar surfaces, a second pyramidal element comprising a second plurality of angled planar surfaces and a convex upper surface, a central retaining screw that threadingly engages the multi-unit abutment, and an O-ring, wherein the O-ring engages each of the plurality of expansion segments.

13 Claims, 6 Drawing Sheets

ADJUSTABLE LOCKING DEVICE AND METHODS OF USING SAME

BACKGROUND

1. Field of Inventions

The field of this application and any resulting patent is devices for prosthetics and methods of using same.

2. Description of Related Art

Dental implant surgery is a procedure that replaces the roots of teeth with metal, screw-like posts and replaces damaged or missing teeth that look and function much like real teeth. Dental implant surgery can offer an alternative to dentures, single-tooth loss, or bridgework that may not fit well. One of the major benefits of dental implants is that they provide solid support for a patient's tooth-a process that requires the bone to heal tightly around the implant ("osseointegration"). Dental implants also allow reconstruction with stable, comfortable replacement teeth, maintaining the integrity of facial structures and a natural appearance.

Modern dental practices, seeking economies of time at the patient's side and in the laboratory, strive to provide completed and installed dental implant prosthetics in a single sitting. Three-dimensional images displayed and manipulated on a computer screen are derived from a computer aided tomography ("CAT") scan revealing all oral structures. Virtual implants and prosthetics are tried in this virtual space until a best case is developed. The number and type of implants, their placement angles and depths, the density of bone, and the avoidance of critical structures are tested in this virtual space. Surgical drilling and implant registration guides are generated with rapid prototyping tools to ensure an almost exact relative placement of a set of implants.

Nonetheless, minor deviations and anatomical requirements can prevent alignment of implants and the matching abutments with the final prosthesis. Under these circumstances, additional laboratory procedures, such as cutting and welding to correct a prosthodontic substructure, must be done to ensure a passive fit of the prosthesis. One solution suggested is to provide an abutment having a smaller mating end resulting in a gap between the abutment and prosthesis for cementing, referred to as the CAL technique. In the CAL technique, a disposable shim is slipped between each abutment and the prosthodontic cylindrical pass through to make a gap to compensate for misalignment. The gap is then filled with a resin cement to secure the prosthesis to the abutment. Thus, there is a need for an adjustable attachment compensating for vertical planar, horizontal planar, and angular movement by securely and removably locking in place an abutment retaining screw. The need for cementation with all its shortcomings would be eliminated.

Various methods and devices have been proposed and utilized for dental implants, including some of the methods and devices disclosed in the references appearing on the face of this patent. However, those methods and devices lack all the steps or features of the methods and devices covered by any patent claims below. As will be apparent to a person of ordinary skill in the art, any methods and devices covered by claims of the issued patent solve many of the problems that prior art methods and devices have failed to solve. Also, the methods and devices covered by at least some of the claims of this patent have benefits that could be surprising and unexpected to a person of ordinary skill in the art based on the prior art existing at the time of invention.

SUMMARY

One or more specific embodiments disclosed herein includes a dental apparatus comprising a prosthesis; an implant fixture, wherein the implant fixture comprises a recess; a multi-unit abutment comprising a clocked projection and a conic section, wherein the clocked projection engages the recess of the implant fixture; and an adjustable locking device. The adjustable locking device comprises a washer comprising a tapered interior and a concave upper surface, wherein the tapered interior engages the conic section of the multi-unit abutment; a first pyramidal element comprising a convex lower surface and a first plurality of angled planar surfaces, wherein the convex lower surface engages the concave upper surface of the washer; a plurality of expansion segments each comprising a plurality of bottom planar surfaces and a plurality of top planar surfaces, wherein each of the plurality of bottom planar surfaces engages at least one of the first plurality of angled planar surfaces of the first pyramidal element; a second pyramidal element comprising a second plurality of angled planar surfaces and a convex upper surface, wherein each of the second plurality of angled planar surfaces engages at least one of the plurality of top planar surfaces of at least one of the plurality of expansion segments; a central retaining screw that threadingly engages the multi-unit abutment; and an O-ring, wherein the O-ring engages each of the plurality of expansion segments.

One or more specific embodiments disclosed herein includes a prosthetic apparatus comprising a prosthesis; an implant fixture, wherein the implant fixture comprises a recess; a multi-unit abutment comprising a clocked projection and a conic section, wherein the clocked projection engages the recess of the implant fixture; and an adjustable locking device. Further, the adjustable locking device may comprise a washer, a first pyramidal element, a plurality of expansion segments, a second pyramidal element, and a central retaining screw.

One or more specific embodiments disclosed herein includes an adjustable locking device comprising a washer comprising a tapered interior and a concave upper surface; a first pyramidal element comprising a convex lower surface and a first plurality of angled planar surfaces, wherein the convex lower surface engages the concave upper surface of the washer; a plurality of expansion segments each comprising a plurality of bottom planar surfaces and a plurality of top planar surfaces, wherein each of the plurality of bottom planar surfaces engages at least one of the first plurality of angled planar surfaces of the first pyramidal element; a second pyramidal element comprising a second plurality of angled planar surfaces and a convex upper surface, wherein each of the second plurality of angled planar surfaces engages at least one of the plurality of top planar surfaces of at least one of the plurality of expansion segments; a central retaining screw; and an O-ring, wherein the O-ring engages each of the plurality of expansion segments.

DETAILED DESCRIPTION

1. Introduction

Figure 1:
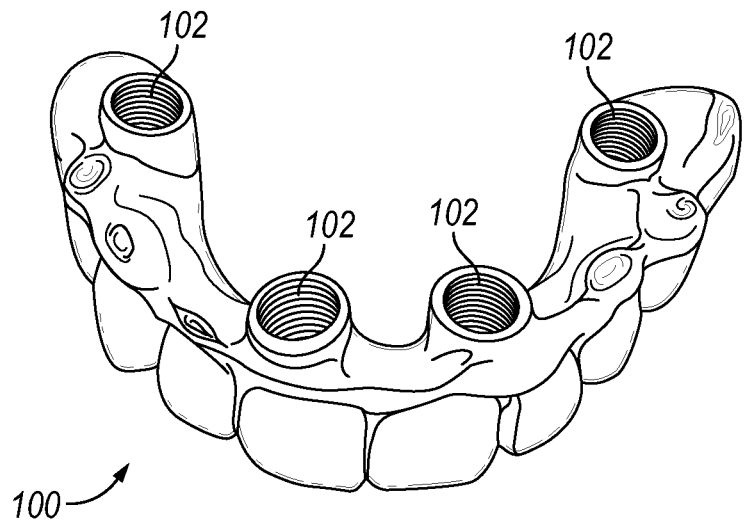
FIG. 1 is a perspective view of an embodiment of a dental prosthesis.

The embodiments described herein may address any displacement of the axis between abutments and the cylindrical pass-through openings within a dental prosthesis. The apparatus in the embodiments may reside above the soft tissue line and may also avoid oral hygiene and adjustment difficulties. Further, the apparatus described in the embodiments may work equally as well with prosthetics built with standard laboratory techniques. The embodiments described herein resolve what may be referred to as the "last millimeter misalignment problem."

Generally, the avoidance of peri-implant bone loss and soft tissue inflammation requires an unstressed fit along with a smooth transition through the soft tissue. Unstrained adjustment allows for predictable healing and integration of the implants in bone. In some of the embodiments described below, several degrees of freedom of motion for near perfect alignment may be incorporated in a simple to install and adjustable apparatus. Thus, laboratory reworking and chair-side adjustments may be reduced substantially or eliminated entirely.

Generally, embodiments may rely upon two sets of working surfaces to align cylindrical segments within a pass-through opening of the prosthesis. In embodiments, each set of working surfaces may consist of a semi-spherical concave surface riding upon a semi-spherical convex surface to compensate for angular misalignment. In embodiments, upon tightening of a central retaining screw, the cylindrical segments may be forced outward into a fixed alignment with the angled or misaligned prosthesis. In embodiments, the cylindrical segments may be free to select any vertical height within the prosthetic pass-through prior to tightening the central retaining screw. Simultaneously, in embodiments the X-Y planar adjustments (roughly in the occlusal plane) may be possible prior to tightening the same central retaining screw. Owing to the tiny nature of parts designed to support a dental prosthesis, the broadest sliding surfaces may be necessary for strength. Further, the designs of the embodiments may be manufactured using high-tensile strength titanium alloys or ceramic components commonly used in the dental implant industry.

A detailed description will now be provided. The purpose of this detailed description, which includes the drawings, is to satisfy the statutory requirements of 35 U.S.C. § 112. For example, the detailed description includes a description of the inventions defined by the claims and sufficient information that would enable a person having ordinary skill in the art to make and use the inventions. In the figures, like elements are generally indicated by like reference numerals regardless of the view or figure in which the elements appear. The figures are intended to assist the description and to provide a visual representation of certain aspects of the subject matter described herein. The figures are not all necessarily drawn to scale, nor do they show all the structural details of the systems, nor do they limit the scope of the claims.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein may be defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in any printed publication, dictionary, or issued patent.

2. Certain Specific Embodiments

Now, certain specific embodiments are described, which are by no means an exclusive description of the inventions. Other specific embodiments, including those referenced in the drawings, are encompassed by this application and any patent that issues therefrom.

One or more specific embodiments disclosed herein includes a dental apparatus comprising a prosthesis; an implant fixture, wherein the implant fixture comprises a recess; a multi-unit abutment comprising a clocked projection and a conic section, wherein the clocked projection engages the recess of the implant fixture; and an adjustable locking device. The adjustable locking device comprises a washer comprising a tapered interior and a concave upper surface, wherein the tapered interior engages the conic section of the multi-unit abutment; a first pyramidal element comprising a convex lower surface and a first plurality of angled planar surfaces, wherein the convex lower surface engages the concave upper surface of the washer; a plurality of expansion segments each comprising a plurality of bottom planar surfaces and a plurality of top planar surfaces, wherein each of the plurality of bottom planar surfaces engages at least one of the first plurality of angled planar surfaces of the first pyramidal element; a second pyramidal element comprising a second plurality of angled planar surfaces and a convex upper surface, wherein each of the second plurality of angled planar surfaces engages at least one of the plurality of top planar surfaces of at least one of the plurality of expansion segments; a central retaining screw that threadingly engages the multi-unit abutment; and an O-ring, wherein the O-ring engages each of the plurality of expansion segments.

One or more specific embodiments disclosed herein includes a prosthetic apparatus comprising a prosthesis; an implant fixture, wherein the implant fixture comprises a recess; a multi-unit abutment comprising a clocked projection and a conic section, wherein the clocked projection engages the recess of the implant fixture; and an adjustable locking device. Further, the adjustable locking device may comprise a washer, a first pyramidal element, a plurality of expansion segments, a second pyramidal element, and a central retaining screw.

One or more specific embodiments disclosed herein includes an adjustable locking device comprising a washer comprising a tapered interior and a concave upper surface; a first pyramidal element comprising a convex lower surface and a first plurality of angled planar surfaces, wherein the convex lower surface engages the concave upper surface of the washer; a plurality of expansion segments each comprising a plurality of bottom planar surfaces and a plurality of top planar surfaces, wherein each of the plurality of bottom planar surfaces engages at least one of the first plurality of angled planar surfaces of the first pyramidal element; a second pyramidal element comprising a second plurality of angled planar surfaces and a convex upper surface, wherein each of the second plurality of angled planar surfaces engages at least one of the plurality of top planar surfaces of at least one of the plurality of expansion segments; a central retaining screw; and an O-ring, wherein the O-ring engages each of the plurality of expansion segments.

In any one of the apparatus or methods disclosed herein, the plurality of expansion segments may comprise three segments.

In any one of the apparatus or methods disclosed herein, the adjustable locking device may further comprise an additional washer.

In any one of the apparatus or methods disclosed herein, the adjustable locking device may further comprise an additional O-ring.

In any one of the apparatus or methods disclosed herein, the multi-unit abutment may comprise a straight orientation.

In any one of the apparatus or methods disclosed herein, the multi-unit abutment may comprise an angled orientation.

In any one of the apparatus or methods disclosed herein, the recess of the implant fixture may comprise a hexagonal shape.

In any one of the apparatus or methods disclosed herein, the first plurality of angled planar surfaces of the first pyramidal element may comprise three angled planar surfaces.

In any one of the apparatus or methods disclosed herein, the plurality of expansion segments may comprise two segments.

3. Specific Embodiments in the Figures

The drawings presented herein are for illustrative purposes only and are not intended to limit the scope of the claims. Rather, the drawings are intended to help enable one having ordinary skill in the art to make and use the claimed inventions.

Referring to FIGS. 1-4, a specific embodiment, e.g., version or example, of a dental prosthetic apparatus is illustrated. These figures may show features which may be found in various specific embodiments, including the embodiments shown in this specification and those not shown.

Figure 2:
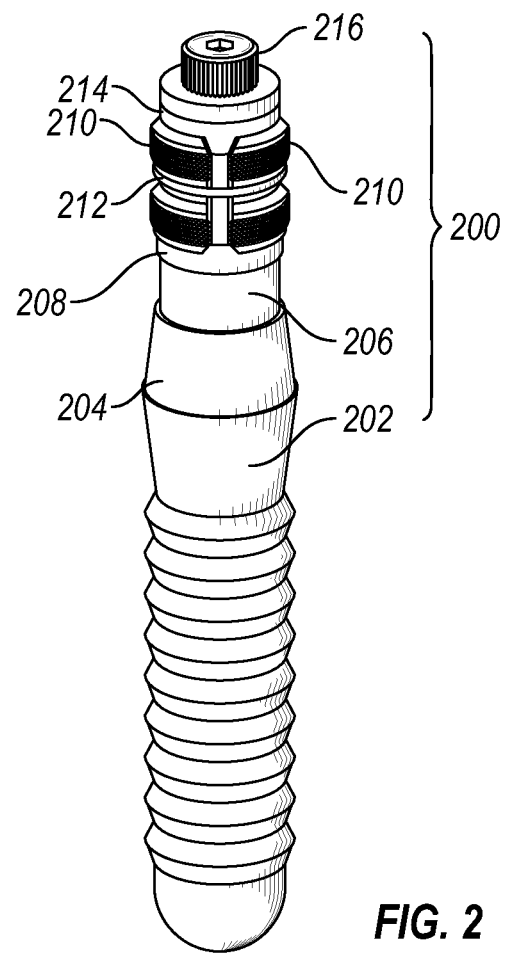
FIG. 2 is a perspective view of an embodiment of an adjustable locking device with a multi-unit abutment and an implant fixture.

FIG. 1 is a perspective view of an embodiment of a dental prosthesis 100, which may comprise one or more apertures 102. FIG. 2 is a perspective view of an embodiment of an adjustable locking device 200 with a multi-unit abutment 204 and an implant fixture 202, wherein the adjustable locking device 200 may be assembled with the multi-unit abutment 204 and the implant fixture 202. In embodiments, the prosthesis 100 may comprise a prosthesis to address multiple teeth missing, as illustrated in FIG. 1.

Figure 3:
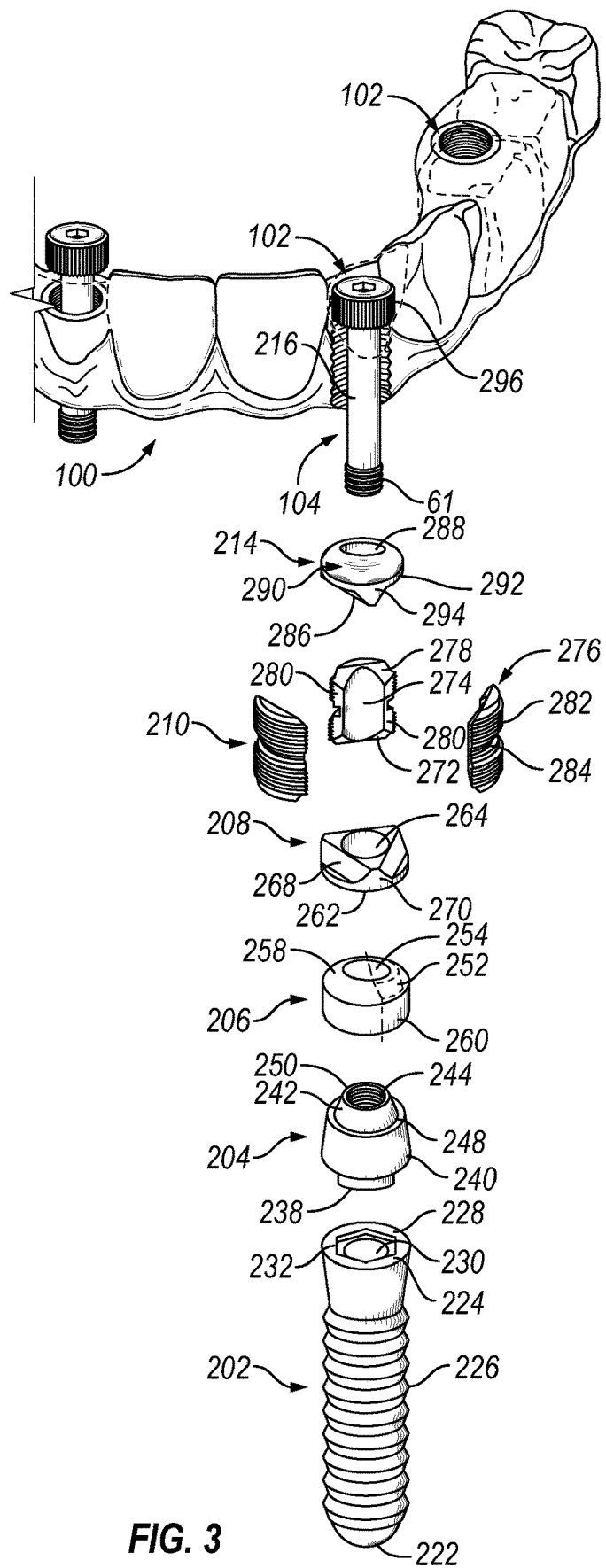
FIG. 3 is an exploded view of an embodiment of an adjustable locking device within a cut away of an embodiment of a prosthesis.

FIG. 3 is an exploded view of an embodiment of the adjustable locking device 200 with the multi-unit abutment 204 and the implant fixture 202. Further, FIG. 3 shows an embodiment of the prosthesis 100 comprising the apertures 102, which may comprise a set of grooves 104. As shown in FIG. 3, in embodiments the implant fixture 202 may comprise a first end 222, a second end 224, and a plurality of external threads 226. In embodiments, the first end 222 may comprise a hemispherical shape, as shown in FIG. 3. In alternative embodiments, the first end 222 may comprise any other appropriate shape. In embodiments, the second end 224 may comprise a tapered shape, as shown in FIG. 3. Further, in other embodiments the second end 224 may comprise a consistent outer diameter. Additionally, in embodiments the plurality of external threads 226 may comprise different pitches, thread angles, depths, minor diameters, pitch diameters, major diameters, helix angles, roots, and crests. In embodiments, the first end 222 and the plurality of external threads 226 may be screwed into bone (not shown).

Still referring to FIG. 3, in embodiments, the second end 224 may comprise a top surface 228. In embodiments, the top surface 228 may comprise a threaded aperture 230 and a recess 232. In embodiments, the recess 232 may comprise a hexagonal shape. Further, in embodiments the threaded aperture 230 and the recess 232 may be centered in the top surface 228. In embodiments, the threaded aperture 230 may comprise internal, female threads for receiving the male threads of a central retaining screw 216. In embodiments, the recess 232 may accept a clocked projection 238 of the multi-unit abutment 204. In embodiments, the second end 224 may be tapered such that the outer diameter of the top surface 228 is larger than the outer diameter of the opposite end of the second end 224, which abuts the external threads 226. In embodiments, the external threads 226 may be positioned between the first end 222 and the second end 224. In alternative embodiments, the implant fixture 202 may not comprise the threaded aperture 230 and may not receive the central retaining screw 216.

Figure 3A:
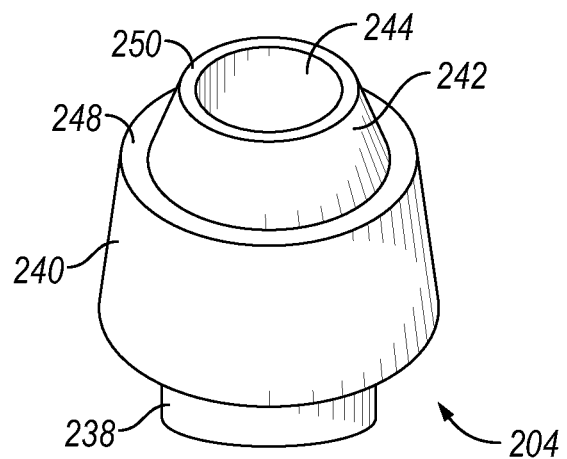
FIG. 3A is a perspective view of an embodiment of a straight multi-unit abutment.

Also shown in FIG. 3 is an embodiment of the multi-unit abutment 204. FIG. 3A is also a perspective view of an embodiment of the multi-unit abutment 204. In embodiments, the multi-unit abutment 204 may comprise the clocked projection 238, a tapered section 240, a conic section 242, and a central bore 244. In embodiments, the clocked projection 238 may comprise a hexagonal shape, and the clocked projection 238 may engage the recess 232 of the implant fixture 202.

In embodiments, the tapered section 240 of the multi-unit abutment 204 may comprise a bottom surface 246 (not shown), which may be adjacent to the clocked projection 238, as well as the top surface 248, which may be adjacent to the conic section 242. In embodiments, the bottom surface 246 (not shown) may be flat, and the top surface 248 may also be flat. Further, in embodiments, the outer diameter of the top surface 248 may be less than the outer diameter of the bottom surface 246. Further, in embodiments, the outer surface of the tapered section 240 may be tapered so that the outer diameter of the tapered section 240 increases from the top surface 248 to the bottom surface 246.

In embodiments, the conic section 242 of the multi-unit abutment 204 may terminate at one end with the tapered section 240. In embodiments, the other end of the conic section 242 may comprise an upper ledge 250. In embodiments, the outer diameter of the upper ledge 250 may be less than the outer diameter of the end of the conic section 242 terminating at the tapered section 240. Thus, in embodiments, the conic section 242 may be tapered so that the outer diameter of the conic section 242 may increase from the upper ledge 250 to the other end of the conic section 242, which terminates at the tapered section 240. In embodiments, the conic section 242 may engage an interior 252 of a first washer 206. In embodiments, this engagement of the conic section 242 with the interior 252 of the first washer 206 may form a tapered lock. In certain embodiments, the conic section 242 may comprise a hexagonal shape, which may allow for a surface allowing for improved manipulation of the multi-unit abutment 204.

Figure 3B:
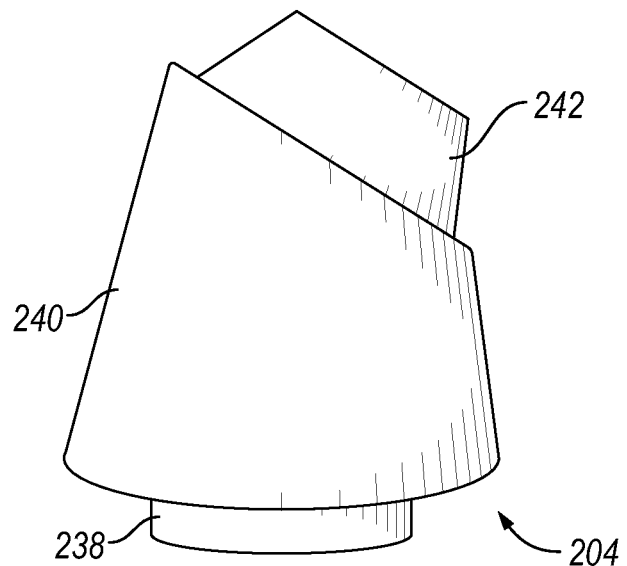
FIG. 3B is a perspective view of an embodiment of an angled multi-unit abutment.

In embodiments, the central bore 244 of the multi-unit abutment 204 may comprise a consistent internal diameter, and the central bore 244 may comprise threads for engaging the central retaining screw 216. In embodiments, the multi-unit abutment 204 may comprise a straight abutment. In other embodiments, as shown in FIG. 3B, the multi-unit abutment 204 may comprise an angled abutment, which may be employed, for example, when the implant fixture 202 may require insertion at an angle.

Figure 3C:
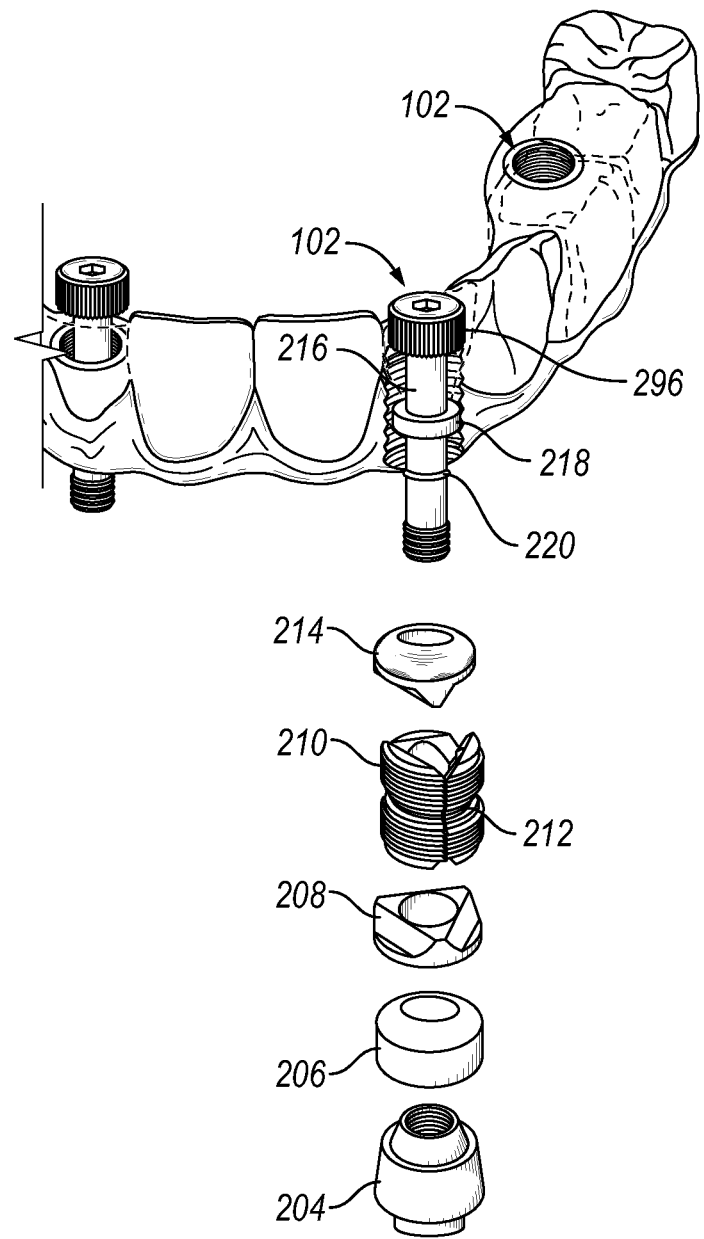
FIG. 3C is an exploded view of an alternative embodiment of an adjustable locking device.

Still referring to FIG. 3, in embodiments the adjustable locking device 200 may comprise the first washer 206, a first pyramidal element 208, a plurality of expansion segments 210, a first O-ring 212 (see FIG. 2), a second pyramidal element 214, and the central retaining screw 216. In embodiments, the adjustable locking device 200 may further comprise a second washer 218 and a second O-ring 220, as illustrated in FIG. 3C.

Figure 3D:
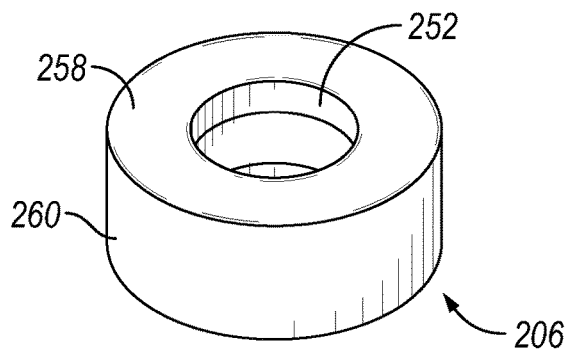
FIG. 3D is a perspective view of an embodiment of a first washer.
Figure 3E:
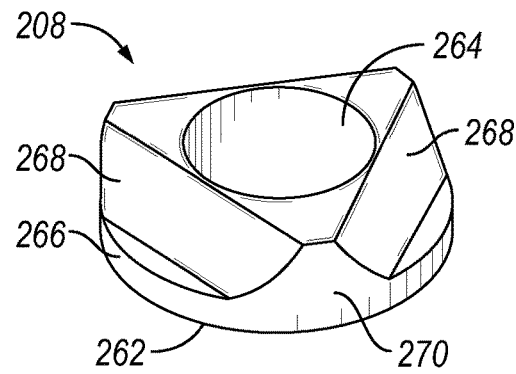
FIG. 3E is a perspective view showing the bottom of an embodiment of a pyramidal element.
Figure 3F:
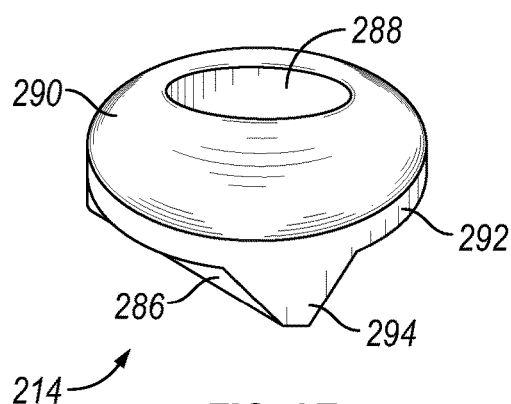
FIG. 3F is a perspective view showing the top of an embodiment of a pyramidal element.
Figure 3G:
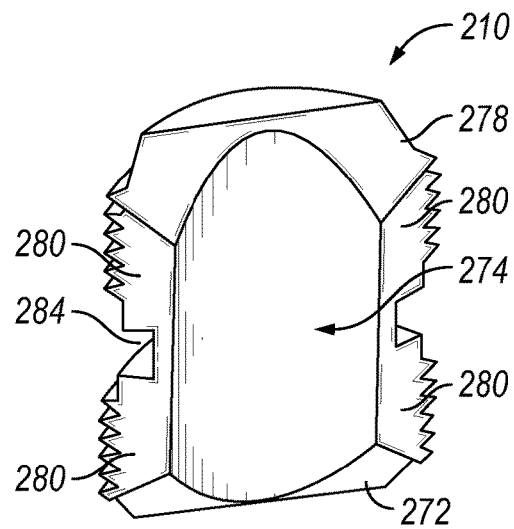
FIG. 3G is a perspective view of an embodiment of one of the expansion segments.
Figure 3H:
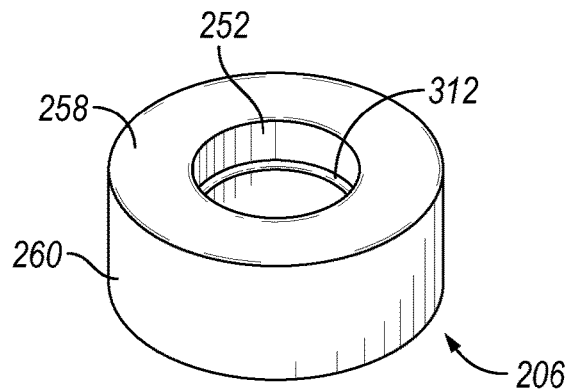
FIG. 3H is a perspective view of an embodiment of a first washer with an O-ring.

FIG. 3 further illustrates an embodiment of the first washer 206, which may comprise a bore 254, a lower lip 256 (not shown), the interior 252, an upper surface 258, and an outer surface 260. FIG. 3D is a perspective view of the first washer 206. In embodiments, the interior 252 may be enlarged to accommodate an alternative O-ring 312, which is illustrated in FIG. 3H and which may be employed as an alternative to the second O-ring 220. In embodiments, the bore 254 may be centered in the first washer 206. Further, in embodiments the bore 254 may act as a pass-through and receive the central retaining screw 216. In embodiments, the internal diameter of the bore 254 may be larger than the outer diameter of the central retaining screw 216, which may allow some lateral motion parallel to the plane of the top surface 248 of the multi-unit abutment 204. In embodiments, the interior 252 may be tapered so that the internal diameter of the bore 254 at the upper surface 258 is less than the internal diameter of the bore 254 at the lower lip 256. Further, in embodiments the interior 252 may engage the conic section 242 of the multi-unit abutment 204, which may form a tapered lock. In embodiments, the upper surface 258 may be concave, which may allow for some angular movement between the upper surface 258 and a convex lower surface 262 of the first pyramidal element 208. In embodiments, the outer surface 260 of the first washer 206 may comprise a uniform outer diameter.

FIG. 3 further illustrates an embodiment of the first pyramidal element 208. In embodiments, the first pyramidal element 208 may comprise a central bore 264, the lower surface 262, a central outer surface 266, a plurality of angled planar surfaces 268, and a plurality of corners 270. FIG. 3E is a perspective view of an embodiment of the first pyramidal element 208. In embodiments, the central bore 264 may comprise a uniform inner diameter, and the central bore 264 may receive the central retaining screw 216. Additionally, in embodiments the inner diameter of the central bore 264 may be larger than the outer diameter of the threads of the central retaining screw 216, allowing movement of the central retaining screw 216 within the central bore 264.

In embodiments, the lower surface 262 of the first pyramidal element 208 may comprise a convex surface, which may engage the upper, concave surface 258 of the first washer 206. In embodiments, the central outer surface 266 may comprise a uniform outer diameter.

In embodiments, three angled planar surfaces 268 and three corners 270 may form the shape of a triangle, as shown in FIGS. 3 and 3E. FIG. 3F is a perspective view of an embodiment of the second pyramidal element 214. In embodiments, the angled planar surfaces 268 may comprise an acute angle wherein each of the faces of the angled planar surfaces 268 may slidingly engage one of a plurality of bottom planar surfaces 272 of the expansion segments 210. In embodiments, the engagement of the angled planer surfaces 268 and the bottom planar surfaces 272 over a broad area may prevent galling and binding. In embodiments, each end of each of the angled planar surfaces 268 terminates with one of the corners 270, as illustrated in FIGS. 3 and 3E. In embodiments, each of the corners 270 may comprise an obtuse angle. In embodiments, the upward pressure from the first pyramidal element 208 may force the expansion segments 210 outward, wherein the expansion segments 210 may lockingly engage with the grooves 104 of the prosthesis 100.

FIG. 3 also illustrates an embodiment of the plurality of expansion segments 210. In embodiments, each of the expansion segments 210 may comprise an inner surface 274, an exterior surface 276, the bottom planar surface 272, a top planar surface 278, and two side surfaces 280. FIG. 3G is a perspective view of an embodiment of one of the expansion segments 210. In embodiments, the inner surface 274 may comprise a concave surface. Further, in embodiments, when the expansion segments 210 are combined as illustrated in FIG. 2, the concave inner surfaces 274 of the expansion segments 210 may form a bore for receiving the central retaining screw 216. In embodiments, the size of the bore created by the inner surfaces 274 may vary depending on how tightly the central retaining screw 216 is screwed into the multi-unit abutment 204. In embodiments, the inner diameter of the combined expansion segments 210 may be larger than the outer diameter of the threads of the central retaining screw 216, allowing movement of the central retaining screw 216 within the combined expansion segments 210.

In embodiments, the exterior surface 276 of the expansion segments 210 may comprise a set of external locking ridges 282 and a groove 284. In embodiments, the external locking ridges 282 may engage the interior grooves 104 of the prosthesis 100. In embodiments, the groove 284 may horizontally bisect the external locking ridges 282 into roughly equal halves, as illustrated in FIGS. 3 and 3G. In embodiments, the groove 284 may receive the first O-ring 212.

In embodiments, the bottom planar surface 272 may engage the angled planar surface 268 of the first pyramidal element 208. Further, in embodiments, the top planar surface 278 may engage an angled planar surface 286 of the second pyramidal element 214. In embodiments, the bottom planar surface 272 and the top planar surface 278 may offer a broad, flat surface to ensure distributed stress on all components. Further, in embodiments, each of the side surfaces 280 may be angled so that one side surface 280 of one expansion segment 210 may engage one side surface 280 of a separate expansion segment 210. Alternatively, in embodiments each expansion segment 210 may be separated by a space from the other expansion segments 210.

As shown in FIG. 2, in embodiments the first O-ring 212 may comprise a resilient elastomeric O-ring to capture the expansion segments 210 in close proximity to allow for ease of insertion within the prosthesis 100 on top of the adjustable locking device 200. In embodiments, the first O-ring 212 may engage the groove 284 of each expansion segment 210. FIG. 3 illustrates an embodiment of the plurality of expansion segments comprising three expansion segments 210. In alternative embodiments, the plurality of expansion segments 210 may comprise two expansion segments 210.

In embodiments, the external locking ridges 282 may mate and lock with the interior grooves 104 of the prosthesis 100. In embodiments, this may allow for a locking adjustment in the vertical direction along the Z-axis of the prosthesis 100. In embodiments, the external locking ridges 282 and the grooves 104 may be removably locked together within a fraction of a millimeter upon tightening of the central retaining screw 216. Therefore, in embodiments, there may be no permanent distortion or deformation of any components. Further, in embodiments, the external locking ridges 282 and the grooves 104 may be inclined to a thread pitch to allow for finer adjustments.

FIG. 3 further illustrates an embodiment of the second pyramidal element 214. In embodiments, the second pyramidal element 214 may comprise a central bore 288, an upper surface 290, a central outer surface 292, a plurality of angled planar surfaces 286, and a plurality of corners 294. In embodiments, the second pyramidal element 214 may resemble the first pyramidal element 208 shown in FIG. 3E. In embodiments, the central bore 288 may comprise a uniform inner diameter, and the central bore 288 may receive the central retaining screw 216.

In embodiments, the upper surface 290 of the second pyramidal element 214 may comprise a convex surface, which may engage the underside of a cap 296 of the central retaining screw 216. In embodiments, the central outer surface 292 may comprise a uniform outer diameter. In embodiments, the inner diameter of the central bore 288 may be larger than the outer diameter of the threads of the central retaining screw 216, allowing movement of the central retaining screw 216 within the central bore 288.

FIG. 3 also illustrates an embodiment of the central retaining screw 216. In embodiments, the threaded portion of the central retaining screw 216 may engage the threads of the multi-unit abutment 204 and the threads of the dental implant fixture 202. Alternatively, the threaded portion of the central retaining screw 216 may engage only the threads of the multi-unit abutment 204. In embodiments, the underside of the cap 296 of screw 216 may comprise a concave surface. In embodiments, the underside of the cap 296 may engage the upper surface 290 of the second pyramidal element 214. Alternatively, in embodiments the second washer 218 may be positioned between the underside of the cap 296 and the upper surface 290 of the second pyramidal element 214. The second washer 218 may comprise the same features as the first washer 206. Further, in embodiments the bore 254 of the second washer 218 may receive the central retaining screw 216. In embodiments, the internal diameter of the bore 254 of the second washer 218 may be larger than the outer diameter of the central retaining screw 216. In embodiments, the interior 252 may be tapered so that the internal diameter of the bore 254 at the upper surface 258 is less than the internal diameter of the bore 254 at the lower lip 256. Further, in embodiments the interior 252 may engage the upper surface 290 of the second pyramidal element 214. In alternative embodiments, the upper surface 258 of the second washer 218 may be convex, which may allow for some angular movement between the upper surface 258 and the underside of the cap 296. In embodiments, the outer surface 260 may comprise a uniform outer diameter.

Figure 4:
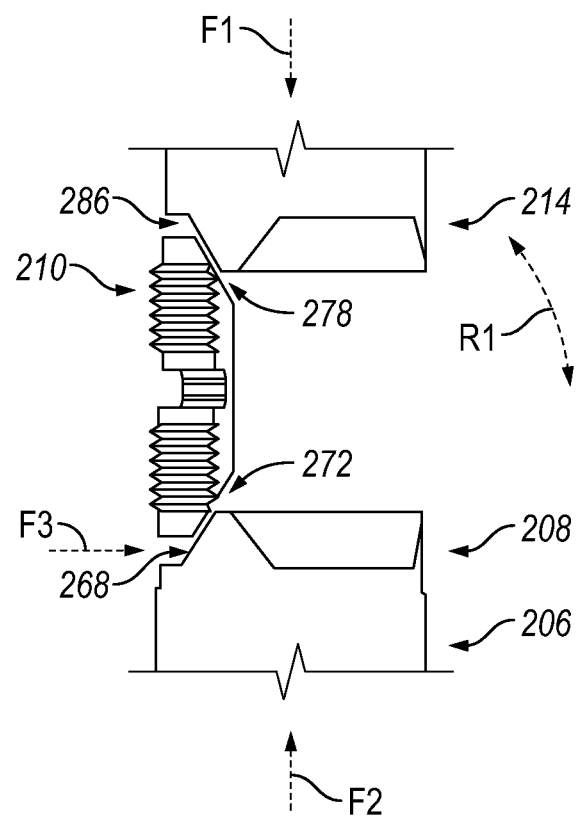
FIG. 4 illustrates an orthogonal side view of an embodiment of the adjustable locking device.

FIG. 4 illustrates an orthogonal side view of an embodiment of the adjustable locking device 200 showing the expansion segments 210, the first pyramidal element 208, and the second pyramidal element 214. FIG. 4 may also help illustrate the mechanism for altering the skew angle to fix angular misalignment. In embodiments, the underside of the cap 296 of the central retaining screw 216 and the upper surface 290 of the second pyramidal element 214 may engage to provide a mating slip surface allowing for adjustment of the implant 200 about the center of a spherical area 310 indicated in FIG. 4. In embodiments, the upper surface 258 of the first washer 206 may slidingly mate with the lower surface 262 of the first pyramidal element 208. In embodiments, the combination of the mating of the underside of the cap 296 and the upper surface 290, as well as the mating of the upper surface 258 and the lower surface 262, may allow for rotation as indicated in FIG. 4 by the designation R1, wherein the rotation may be at any small angle about the central vertical axis of the implant fixture 202. In embodiments, the rotation angle may be from about 1 to 2 degrees. In other embodiments, the rotation angle may be more than 2 degrees. In embodiments, the bores 244, 254, 264, and 288, as well as the bore that may be created by the combination of expansion segments 210, are oversized in order to accommodate these rotational adjustments. Further, in embodiments, the gaps formed by the enlarged bores 288, 264, and 254 around the central retaining screw 216 may also permit lateral motion in the X-Y occlusal plane between the prosthesis 100 and the vertical axis of the implant device 202.

FIG. 4 also illustrates operating of adjustments in embodiments of the locking mechanism's compressive forces F1 and F2, which may be generated by the tightening of the central retaining screw 216, which may result in an outward projecting force F3 against the grooves 104 by the expansion segments 210. In embodiments, the opposed, inclined top planar surfaces 278 against the angled planar surface 286, as well as the angled planar surfaces 268 against the bottom planar surfaces 272, may transmit forces without galling.

Generally, as shown in the embodiments of the figures, the combined action of both the upper and lower broad sliding surfaces and the combined sliding action between the flats on both upper and lower elements and their respective mating surfaces may be needed to address any angular and/or lateral misalignment of the implant 200. In embodiments, the absence of any components may cause the expansion segments 210 to fail to uniformly lock with the grooves 104 of the prosthesis 100.

In practice, the components of the implant 200 may be pre-assembled in a kit for ease of placement within packaging suitable for sterilization. Further, the kit may include a placement tool (not shown).

During installation of the prosthesis 100 and the implant 200, in embodiments, each component of the implant 200 may be placed and the implant 200 loosely assembled. In embodiments, the prosthesis 100 may be centered over the implant 200, and the central retaining screw 216 may be tightened.

Generally, the above describes an improved apparatus and method of using the same for implant dentistry. However, it should be understood that the apparatus described and the method of using same may also be application to anchoring any medical prosthesis or device within a cylindrical bore in bone or firm body structure.

What is claimed is:

1. A dental apparatus, comprising:
    a prosthesis;
    an implant fixture, wherein the implant fixture comprises a recess;
    a multi-unit abutment comprising a clocked projection and a conic section, wherein the clocked projection engages the recess of the implant fixture; and
    an adjustable locking device, comprising:
        a washer comprising a tapered interior and a concave upper surface, wherein the tapered interior engages the conic section of the multi-unit abutment;
        a first pyramidal element comprising a convex lower surface and a first plurality of angled planar surfaces, wherein the convex lower surface engages the concave upper surface of the washer;
        a plurality of expansion segments each comprising a plurality of bottom planar surfaces and a plurality of top planar surfaces, wherein each of the plurality of bottom planar surfaces engages at least one of the first plurality of angled planar surfaces of the first pyramidal element;
        a second pyramidal element comprising a second plurality of angled planar surfaces and a convex upper surface, wherein each of the second plurality of angled planar surfaces engages at least one of the plurality of top planar surfaces of at least one of the plurality of expansion segments;
        a central retaining screw that threadingly engages the multi-unit abutment; and
        an O-ring, wherein the O-ring engages each of the plurality of expansion segments.

2. The dental prosthetic apparatus of claim 1, wherein the plurality of expansion segments comprises three segments.

3. The dental prosthetic apparatus of claim 1, wherein the adjustable locking device further comprises an additional washer.

4. The dental prosthetic apparatus of claim 1, wherein the adjustable locking device further comprises an additional O-ring.

5. The dental prosthetic apparatus of claim 1, wherein the multi-unit abutment comprises a straight orientation.

6. The dental prosthetic apparatus of claim 1, wherein the multi-unit abutment comprises an angled orientation.

7. The dental prosthetic apparatus of claim 1, wherein the recess of the implant fixture comprises a hexagonal shape.

8. An adjustable locking device, comprising:
    a washer comprising a tapered interior and a concave upper surface;
    a first pyramidal element comprising a convex lower surface and a first plurality of angled planar surfaces, wherein the convex lower surface engages the concave upper surface of the washer;
    a plurality of expansion segments each comprising a plurality of bottom planar surfaces and a plurality of top planar surfaces, wherein each of the plurality of bottom planar surfaces engages at least one of the first plurality of angled planar surfaces of the first pyramidal element;
    a second pyramidal element comprising a second plurality of angled planar surfaces and a convex upper surface, wherein each of the second plurality of angled planar surfaces engages at least one of the plurality of top planar surfaces of at least one of the plurality of expansion segments;
    a central retaining screw; and
    an O-ring, wherein the O-ring engages each of the plurality of expansion segments.

9. The adjustable locking device of claim 8, wherein the plurality of expansion segments comprises three segments.

10. The adjustable locking device of claim 9, wherein the first plurality of angled planar surfaces of the first pyramidal element comprises three angled planar surfaces.

11. The adjustable locking device of claim 8, wherein the plurality of expansion segments comprises two segments.

12. The adjustable locking device of claim 8, wherein the adjustable locking device further comprises an additional washer.

13. The adjustable locking device of claim 8, wherein the adjustable locking device further comprises an additional O-ring.

* * * * *